(12) United States Patent
Tanida

(10) Patent No.: US 7,877,159 B2
(45) Date of Patent: Jan. 25, 2011

(54) METHOD AND APPARATUS FOR MANAGING PRODUCTION HISTORY INFORMATION OF PIPE OR TUBE AND METHOD FOR PRODUCING PIPE OR TUBE THEREWITH

(75) Inventor: Mutsumi Tanida, Wakayama (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 170 days.

(21) Appl. No.: 12/224,303

(22) PCT Filed: Jul. 6, 2007

(86) PCT No.: PCT/JP2007/063547
§ 371 (c)(1),
(2), (4) Date: Jan. 5, 2009

(87) PCT Pub. No.: WO2008/015871
PCT Pub. Date: Feb. 7, 2008

(65) Prior Publication Data
US 2009/0216361 A1    Aug. 27, 2009

(30) Foreign Application Priority Data
Jul. 31, 2006  (JP) .............................. 2006-208931

(51) Int. Cl.
G06F 19/00 (2006.01)
G06F 7/66 (2006.01)
C23C 8/00 (2006.01)
C23C 22/00 (2006.01)
B23B 35/00 (2006.01)
B23B 47/28 (2006.01)
H05K 3/00 (2006.01)

(52) U.S. Cl. ....................... 700/115; 700/116; 700/117; 700/221; 700/227; 700/159; 148/211; 148/219; 148/226; 408/1 R; 408/8; 408/227

(58) Field of Classification Search ......... 700/115–117, 700/221, 227, 159; 148/211, 219, 226; 408/1 R, 408/8, 67
See application file for complete search history.

(56) References Cited

U.S. PATENT DOCUMENTS 4,120,629 A * 10/1978 Christian et al. ....... 198/341.02

(Continued)

FOREIGN PATENT DOCUMENTS

JP           5-4634         1/1993

(Continued)

*Primary Examiner*—Ramesh B Patel
(74) *Attorney, Agent, or Firm*—Clark & Brody

(57) ABSTRACT

The production history information management apparatus 100 comprises: machining an identifier for identifying a pipe or tube in a region of the pipe or tube on which thread cutting is to be performed before an initial production process is performed among production processes which are management targets of the production history information; reading the identifier machined on the pipe or tube before each of the production processes is performed or while each of the production processes is performed; management for storing the production history information of the pipe or tube obtained in each of the production processes and the identifier read from the pipe or tube while the production history information and the identifier are associated with each other; and thread cutting for removing the identifier machined on the pipe or tube in the process of performing the thread cutting on the end portions of the pipe or tube among the production processes which are management targets of the production history information.

3 Claims, 2 Drawing Sheets

U.S. PATENT DOCUMENTS

| | | | |
|---|---|---|---|
| 4,369,563 A * | 1/1983 | Williamson | 483/7 |
| 4,531,182 A * | 7/1985 | Hyatt | 700/2 |
| 5,555,504 A * | 9/1996 | Lepper et al. | 700/115 |
| 5,768,153 A * | 6/1998 | Hosono et al. | 702/84 |
| 5,970,894 A * | 10/1999 | Mase | 112/102.5 |
| 2002/0169467 A1* | 11/2002 | Heitzmann et al. | 606/159 |
| 2004/0047709 A1* | 3/2004 | DiStasio et al. | 411/329 |
| 2009/0123226 A1* | 5/2009 | Viegener | 403/268 |

FOREIGN PATENT DOCUMENTS

| | | |
|---|---|---|
| JP | 10-180543 | 7/1998 |
| JP | 11-267922 | 10/1999 |
| JP | 2002-46365 | 2/2002 |

* cited by examiner

METHOD AND APPARATUS FOR MANAGING PRODUCTION HISTORY INFORMATION OF PIPE OR TUBE AND METHOD FOR PRODUCING PIPE OR TUBE THEREWITH

TECHNICAL FIELD

The present invention relates to a method and an apparatus for managing production history information of a pipe or tube, in which the production history information can be managed properly and efficiently for each pipe or tube, and a method for producing a pipe or tube using the management method. Hereinafter, "pipe or tube" is referred to as "pipe" when deemed appropriate.

BACKGROUND ART

In a steel pipe producing process, a large number of steel pipes having the same specifications (such as a size and a material) are often produced at the same timing. Therefore, usually in a method for managing the production history information (including inspection result) in each production process, a predetermined number of steel pipes having the same specifications are set to a lot as a unit, and management is performed with a sheet in which the production history information is written for each lot. In this management method, the production history information on each steel pipe is not managed, or a number is directly manually written on the steel pipe in order to identify each steel pipe in the lot and the management is performed by writing the production history information associated with the number assigned to each steel pipe in the sheet.

Recently, for Oil Country Tubular Goods (OCTG) which are ones of applications of steel pipes, because OCTG are used under severe conditions, required specifications such as corrosion resistance have become strict. Therefore, for a steel pipe whose required specifications are strict, it is strongly desired that the production history information be properly managed for each steel pipe.

However, in the method for manually writing the number on the steel pipe, there is inevitably a risk of generating a clerical error because an operator manually writes the number, and there is also a risk of incorrectly reading the number because the operator visually reads the number. Furthermore, there is a risk that the number may become illegible because the number written on the steel pipe is erased in conveying the steel pipe in each production process. Therefore, the obtained production history information may be associated not with the corresponding original steel pipe but with another steel pipe, which may result in inability to properly manage the production history information. Accordingly, the steel pipe which does not satisfy the required specifications is mixed and delivered to a customer, which possibly results in, e.g., occurrence of an accident that brings a serious damage to the customer. In addition to the improper management of the production history information, because the operator manually writes the number and visually reads the number, there is a problem that an excessive man-hour is required to manage the production history information.

In order to solve the above problems, there is proposed a method in which, a number (electric number) is automatically assigned according to the conveyance order of the steel pipe by using a process computer for controlling each of production facilities provided in a steel pipe production line or means for detecting the steel pipe conveyed to each of the production facilities, and the process computer manages the number and the production history information while associating them with each other.

However, the steel pipe production process usually includes a process which is performed off-line while the steel pipe is taken out from the production line (on-line). For example, when the result of a steel pipe inspection process in the production line is defective, the defective steel pipe is taken out from the production line, and cutting of end portions of the steel pipe, treatment of outer and inner surfaces of the steel pipe, straightening and the like are performed. When the steel pipe is taken out from the production line, the process computer cannot manage the production history information on the steel pipe taken out based on the number assigned to the steel pipe in the conveyance order.

DISCLOSURE OF THE INVENTION

In view of the foregoing, an object of the present invention is to provide a method and an apparatus for managing production history information of a pipe, in which the production history information can be managed properly and efficiently for each pipe with respect to the pipes such as OCTG in which thread cutting is performed on end portions thereof, and a method for producing a pipe using the management method.

In order to achieve the object, the present invention provides a method for managing production history information of a pipe or tube in a process for producing the pipe or tube to which thread cutting is performed on end portions thereof, the method comprising the following (1)-(4) steps.

(1) machining an identifier for identifying the pipe or tube in a region of the pipe or tube on which the thread cutting is to be performed by machining means before an initial production process is performed among production processes which are management targets of the production history information (2) reading the identifier machined on the pipe or tube with reading means before each of the production processes is performed or while each of the production processes is performed (3) storing the production history information of the pipe or tube obtained in each of the production processes and the identifier read from the pipe or tube while the production history information and the identifier are associated with each other (4) removing the identifier machined on the pipe or tube in the process of performing the thread cutting on the end portions of the pipe or tube among the production processes which are management targets of the production history information According to the present invention, the identifier (for example, a two-dimensional code and a one-dimensional barcode) for identifying the pipe or tube is directly machined on the pipe or tube by machining means (for example, a mechanical dot marking apparatus and a laser machining apparatus), so that the clerical error or the erase of the identifier during pipe or tube conveyance will never be generated unlike the case where the operator manually writes the number. Additionally the step in which the operator writes the number can be eliminated.

Also, according to the present invention, the identifier machined on the pipe or tube is read by reading means (for example, a light source, a camera, and an image processing apparatus in the case where the identifier is the two-dimensional code, and a laser scanner, a photoelectric sensor and a signal processing apparatus in the case where the identifier is the one-dimensional barcode). Therefore, the risk of generating the clerical error and the step necessary for the reading work is reduced unlike the case where the operator visually reads the manually-written number. Also, according to the present invention, because the identifier is read before each production process is performed (or while each production process is performed), even in the production process which is performed with the pipe or tube taken out from the production line, the obtained production history information of the pipe or tube and the identifier read for the pipe or tube can be stored while associated with each other.

Further, according to the present invention, among the production processes which are management targets of the production history information of a pipe or tube, the identifier is machined in a region of the pipe or tube where the thread cutting is to be performed before the initial production process is performed, and the identifier machined on the pipe or tube is removed in the process in which the thread cutting is performed on the end portions of the pipe or tube. Accordingly, in the production processes which are management targets of the production history information, the identifier is already machined when reading the identifier by the reading means, so that the obtained production history information of the pipe or tube and the identifier read for the pipe or tube can be stored while associated with each other. On the other hand, the identifier is removed in the process where the thread cutting is performed on the end portions of the pipe or tube, and the identifier does not remain on the pipe or tube as the product. Therefore, there is generated no problem even if the pipes or tubes to which the present invention is applied are OCTG for which the required specifications become strict for the corrosion resistance and the like.

Thus, according to the present invention, the production history information can be managed properly and efficiently for each pipe or tube in which the thread cutting is performed on the end portions. In the present invention, "initial production process" shall mean an initial production process among the production processes which are management targets of the production history information by reading the identifier machined on the pipe or tube. "production processes which are management targets of the production history information" shall mean all the production processes in which the conveyance order of the pipe or tube is possibly switched. In the production process in which the conveyance order of the pipe or tube cannot be switched in a series of production processes, the identifier can electrically be given to the pipe or tube without machining the identifier on the pipe or tube, by the process computer or the like according to the conveyance order, and the electric identifier and the production history information can be managed while associated with each other. Immediately after the production process in which the conveyance order of the pipe or tube cannot be switched (i.e., immediately before the production process in which the conveyance order of the pipe or tube is possibly switched), an identifier corresponding to the electric identifier is machined on the pipe or tube, and the machined identifier may be read and managed while associated with the production history information. Therefore, the production history information can be managed properly for each pipe or tube associated with the identifier for not only the production process in which the identifier is machined on the pipe or tube but also the production process in which the identifier is not machined on the pipe or tube (only the electric identifier is given).

In order to achieve the object, the present invention also provides an apparatus for managing production history information in a process for producing a pipe or tube to which thread cutting is performed on end portions thereof, the apparatus comprising: machining means for machining an identifier for identifying the pipe or tube in a region of the pipe or tube on which the thread cutting is to be performed before an initial production process is performed among production processes which are management targets of the production history information; reading means for reading the identifier machined on the pipe or tube before each of the production processes is performed or while each of the production processes is performed; management means for storing the production history information of the pipe or tube obtained in each of the production processes and the identifier read with the reading means from the pipe or tube while the production history information and the identifier are associated with each other; and thread cutting means for removing the identifier machined on the pipe or tube in the process of performing the thread cutting on the end portions of the pipe or tube among the production processes which are management targets of the production history information.

In order to achieve the object, the present invention further provides a method for producing a pipe or tube, comprising a production process in which production history information is managed by the management method.

According to the present invention, the production history information on each pipe or tube, particularly each of OCTG can be managed properly and efficiently.

BRIEF DESCRIPTION OF THE DRAWINGS

FIG. 2 schematically shows various states of a pipe or tube, where

BEST MODE FOR CARRYING OUT THE INVENTION

Embodiments of the case in which the present invention is applied to the process for producing OCTG will be described below with reference to the accompanying drawings. Hereinafter, "OCTG" is referred to as "steel pipe" when deemed appropriate.

Figure 1:
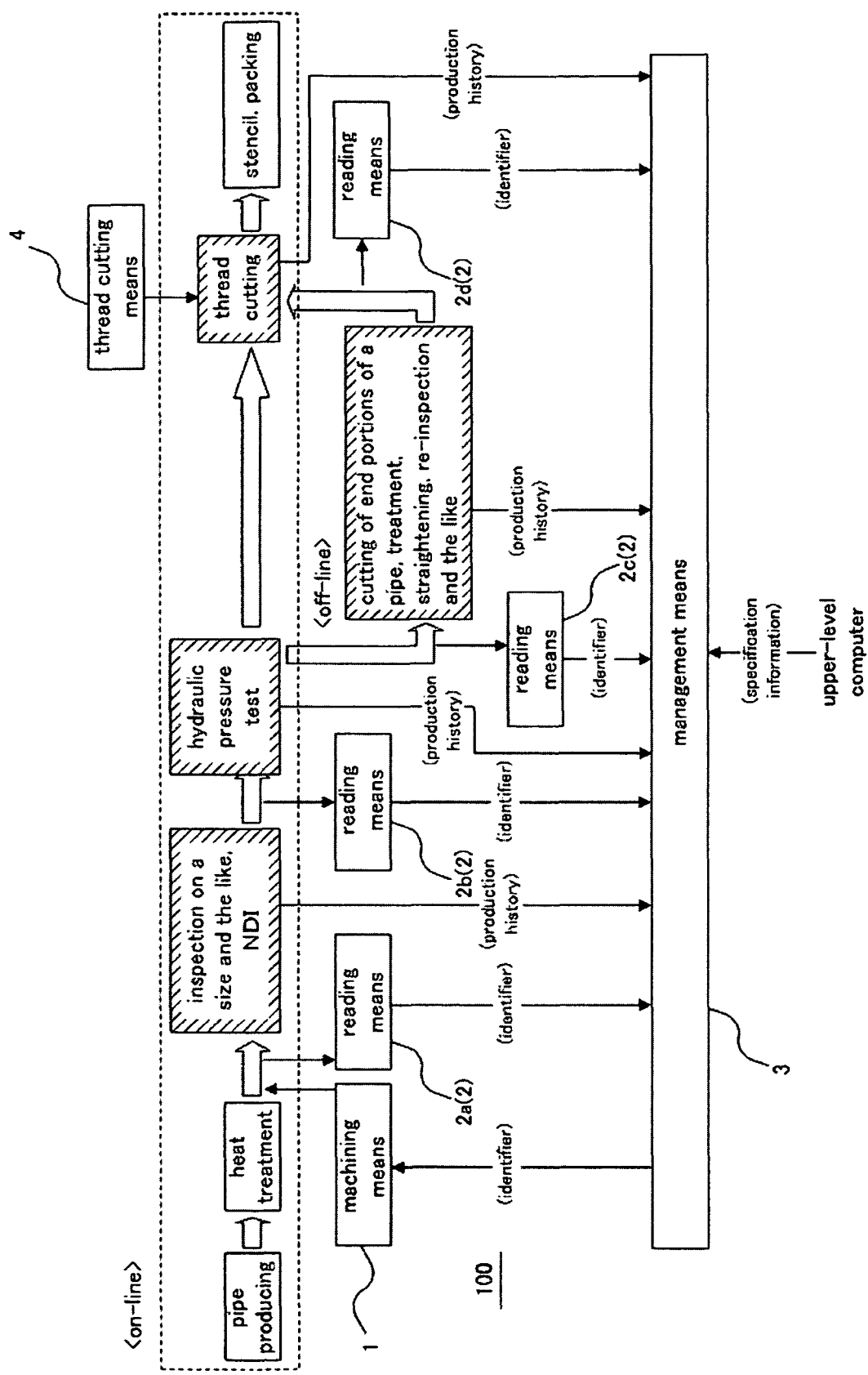
FIG. 1 is a block diagram showing a schematic configuration of a production history information management apparatus according to an embodiment of the present invention.

FIG. 1 is a block diagram showing a schematic configuration of a production history information management apparatus according to an embodiment of the present invention. As shown in FIG. 1, a production history information management apparatus (hereinafter appropriately abbreviated as "management apparatus") 100 according to the present embodiment is one which manages production history information in the process for producing the steel pipe, to which thread cutting is performed on an end portions. First, the schematic process for producing the steel pipe which is of an application target of the production history information management apparatus 100 will be described with reference to FIG. 1.

As shown in FIG. 1, for example, the steel pipe is produced by a series of production processes. That is, the production processes include a pipe producing process by a Mannesmann mandrel mill, a heat treatment process in a heat treatment furnace, a process (hereinafter simply referred to as "inspection process") of performing inspection on, e.g., a size, a shape, and an appearance or non-destructive inspection (NDI), and a hydraulic pressure test process. Then, for the steel pipe with the normal inspection result, a thread cutting process of performing thread cutting on end portions of the steel pipe, stencil marking on the steel pipe and packing the steel pipe are performed. The production processes are performed in a production line (on-line) in which the steel pipes are sequentially conveyed.

On the other hand, for the steel pipe with the defective inspection result in the inspection process or hydraulic pressure test process, the steel pipe is taken out from the on-line, and the production processes (hereinafter simply referred to as "off-line production process") such as cutting of the end portions of the steel pipe, treatment of outer and inner surfaces of the steel pipe, straightening, re-inspection (whether or not bending is corrected and the like) are performed off-line. Then, the steel pipe is returned to the on-line, so that the thread cutting process is performed.

Among the above-described processes for producing the steel pipe, the pieces of production history information of the inspection process, the hydraulic pressure test process, the off-line production process, and the thread cutting process are set as the management targets of the production history information management apparatus 100 according to the present embodiment. A configuration of the management apparatus 100 will be described below.

The management apparatus 100 includes machining means 1, reading means 2, management means 3, and thread cutting means 4.

The machining means 1 machines an identifier for identifying the steel pipe in a region of the steel pipe to which the thread cutting is to be performed before an initial production process (in the embodiment, inspection process) is performed among the production processes which are management targets of the production history information. Specifically, the identification information (hereinafter referred to as work number) is transmitted from an upper-level computer to the management means 3 according to specification information on the steel pipe (including a customer and a delivery date). On the other hand, the management means 3 sequentially gives identification information (hereinafter referred to as piece number) to the steel pipes to which the same work number is given and which are sequentially discharged from a heat treatment furnace in the heat treatment process according to the discharge order of the steel pipe. Then, the work number and the piece number are transmitted from the management means 3 to the machining means 1. The machining means 1 machines the information corresponding to the transmitted work number and piece number as the identifier on the steel pipe.

Preferably, in the machining means 1, the work number and the piece number are coded, and the coded identifier (a one-dimensional barcode or a two-dimensional code such as a QR code and a data matrix) is machined on the steel pipe. Particularly, the two-dimensional code such as the QR code and the data matrix is more preferable compared with the barcode, in that large-capacity information can be expressed by a small-sized code and in that the two-dimensional code has a little reading error. A coding algorithm of the two-dimensional code is standardized in JIS, ISO and the like. In the machining means 1 according to the present embodiment, the two-dimensional code may be produced according to the standardized, known algorithm.

Figure 2A:
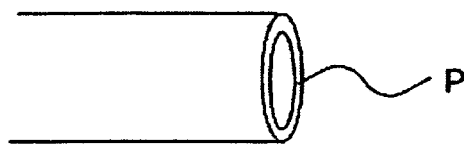
FIG. 2A shows the state of the pipe or tube immediately after a heat treatment process is performed.
Figure 2B:
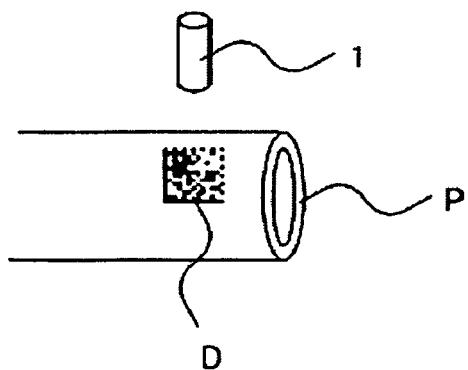
FIG. 2B shows the state of the pipe or tube on which an identifier is machined by machining means.

For example, a mechanical dot marking apparatus or a laser machining apparatus is preferably used as the machining means 1. Specifically, in the case where the machining means 1 is the dot marking apparatus, a pin made of a hard material is pressed against a surface of the steel pipe (steel pipe P in the state shown in FIG. 2A) sequentially discharged from the heat treatment furnace while vibrated at a high speed. In the case where the machining means 1 is the laser machining apparatus, the surface of the steel pipe sequentially discharged from the heat treatment furnace is irradiated with a laser spot which is converged in a micro diameter by an appropriate convergent optical system. Therefore, a fine dot-shaped recess is formed in the surface of the steel pipe. The dot-shaped recess has a size according to a tip shape of the pin or the diameter of the laser spot, and the dot-shaped recess has a depth according to pressing force of the pin or energy density and irradiation time of the laser spot. In the case where the laser machining apparatus is used as the machining means 1, because the steel pipe surface is a curved surface, preferably the convergent optical system having as much a focal depth as possible is used, such that the size of the laser spot is substantially kept constant at each laser spot irradiation position in changing the laser spot irradiation position, which will be described later. In the case of the dot marking apparatus, the position where the pin is pressed is changed according to the identifier to be formed, thereby forming the identifier including the fine dot pattern. In the case of the laser machining apparatus, the laser spot irradiation position is sequentially changed using an appropriate scanning optical system while turning on-and-off of the laser spot irradiation is controlled, thereby forming the identifier including the fine dot pattern. For example, in the case where the two-dimensional code is adopted as the identifier, the two-dimensional code is expressed by the whole of the fine dot pattern machined by the dot marking apparatus or laser marking apparatus 1 (see FIG. 2B). As described later, it is necessary that the identifier formed by the dot marking apparatus or laser marking apparatus 1 be removed by performing the thread cutting with the thread cutting means 4. Therefore, the tip shape or pressing force of the pin or the energy density or irradiation time of the laser spot may appropriately be adjusted such that the depth of the recess formed by pressing the pin or by irradiating the surface with the laser spot is not more than the depth of a thread to be formed by the thread cutting. In the recess formed at the pin pressing position or the laser spot irradiation position on the steel pipe surface, the material structure is changed by heat generation during the laser machining in addition to stress concentration and an increase in hardness. Accordingly, in the steel pipe in which the corrosion resistance is particularly required, it is important to remove the recess before the final process because of a fear that the corrosion resistance is degraded at the recess.

Figure 2C:
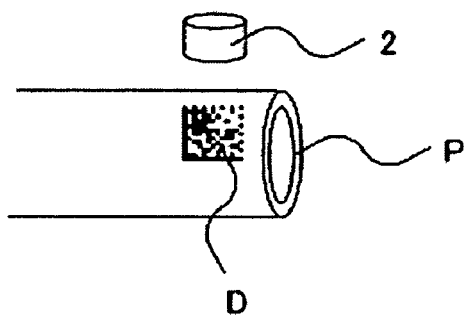
FIG. 2C shows the state of the pipe or tube on which the machined identifier is read.

The reading means 2 reads the identifier machined on the steel pipe before each production process which is a management target is performed or while each production process is performed (see FIG. 2C). In the present embodiment, reading means 2a, reading means 2b, reading means 2c, and reading means 2d are disposed as the reading means 2. The reading means 2a reads the identifier immediately before the inspection process. The reading means 2b reads the identifier immediately before the hydraulic pressure test process. The reading means 2c reads the identifier immediately before the off-line production process. The reading means 2d reads the identifier immediately before the thread cutting process. In the case where the identifier is the two-dimensional code, each reading means 2 includes a light source for illuminating the two-dimensional code, a camera (CCD camera and the like) for imaging the two-dimensional code, and an image processing device which performs image processing on the imaged two-dimensional code image to decode the two-dimensional code into the work number and the piece number. In the case where the identifier is the one-dimensional barcode, each reading means 2 includes a laser scanner for scanning the one-dimensional barcode with the laser beam, a photoelectric sensor which accepts light reflected from the one-dimensional barcode to perform photoelectric conversion, and a signal processing device which performs signal processing on an output signal from the photoelectric sensor to decode the one-dimensional barcode into the work number and the piece number.

When the image processing is performed on the two-dimensional code image, or when the signal processing is performed on the output signal from the photoelectric sensor which accepts the light reflected from the one-dimensional barcode, because a binarization process is frequently performed, it is important that contrast of the identifier be enhanced as much as possible in reading in order to enhance accuracy of reading the identifier. Therefore, if necessary, a paint process or a grinder process may be performed to enhance light diffusion property of the identifier surface, and the disturbance light may be obstructed by a black-out curtain or a distance and an irradiation angle of the light source may appropriately be adjusted.

The identifier read by the reading means 2 is transmitted to the management means 3. On the other hand, the production processes are performed on the steel pipe whose identifier is read by the reading means 2, and the pipe production history information obtained in each production process is manually or automatically inputted to the management means 3. Specifically, the inspection process is performed on the steel pipe whose identifier is read by the reading means 2a, and the inspection result (result of inspection on, e.g., the size, the shape and the appearance or of non-destructive inspection) is inputted to the management means 3 in the form of the production history information. The hydraulic pressure test process is performed on the steel pipe whose identifier is read by the reading means 2b, and the hydraulic pressure test result is inputted to the management means 3 in the form of the production history information. The off-line production process is performed on the steel pipe whose identifier is read by the reading means 2c, and the result (information on cutting the steel pipe ends, the treatment of the outer and inner surfaces of the steel pipe, the straightening, the re-inspection, and the like) is inputted to the management means 3 in the form of the production history information. The thread cutting process is performed on the steel pipe whose identifier is read by the reading means 2d, and the result of the thread cutting is inputted to the management means 3 in the form of the production history information.

The management means 3 stores the steel pipe production history information obtained and inputted in each production process and the steel pipe identifier read by each reading means 2 while the steel pipe production history information and the steel pipe identifier are associated with each other. In other words, when the steel pipe identifier is inputted to the management means 3, the production history information on the steel pipe in each production process stored while assigned to the identifier can be extracted, which allows the production history information to be managed properly for each steel pipe. In the present embodiment, the process computer for controlling the production facilities provided in the steel pipe production line acts as the management means 3.

Figure 2D:
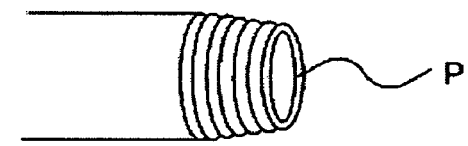
FIG. 2D shows the state of the pipe or tube on which thread cutting is performed by thread cutting means to remove the identifier.

The thread cutting means 4 removes the identifier machined on the steel pipe by performing the thread cutting on the end portions of the steel pipe in the final production process of the production processes which are management targets of the production history information in the present embodiment (see FIG. 2D). A chaser in which a plurality of screw-thread-shaped blade portions are linearly arranged can be used as the thread cutting means 4. After the direction in which the blade portions of the chaser are arranged is aligned in parallel with the axial direction of the steel pipe, the steel pipe is delivered in the axial direction while rotated, which allows the end portions of the steel pipe to be sequentially threaded at each blade portion.

The thread cutting process and the subsequent stencil marking and packing process are continuous processes on-line. The conveyance order of the steel pipe cannot be switched in the both processes, and the both processes are controlled by the process computer 3. Accordingly, even if the identifier machined on the steel pipe is removed by performing the thread cutting process as described above, the identifier is stored in the process computer 3 while the identifier is associated with the conveyance order of the steel pipe in the thread cutting process, which allows the stored identifier to be associated with each steel pipe according to the conveyance order of the steel pipe even in the stencil marking and packing process. In other words, even if the identifier is removed in the thread cutting process, each steel pipe which is shipped as the product through the stencil marking and packing process can be associated with the identifier and the production history information of each steel pipe.

According to the above-described production history information management apparatus 100 and production history information management method therewith according to the present embodiment, among the production processes which are management targets of the production history information of a steel pipe, the identifier is machined in a region of the steel pipe where the thread cutting is to be performed before the initial production process is performed, and the identifier machined on the steel pipe is removed in the process in which the thread cutting is performed on the end portions of the steel pipe. Accordingly, in the production processes which are management targets of the production history information, the identifier is already machined when reading the identifier by the reading means 2, so that the obtained production history information of the steel pipe and the identifier read for the steel pipe can be stored while associated with each other. In other words, the production history information can be managed for each steel pipe by the identifier, with respect to the steel pipe not only passing through the on-line production process but also passing through the off-line production process. On the other hand, the identifier is removed in the process where the thread cutting is performed on the end portions of the steel pipe, and the identifier does not remain on the steel pipe as the product. Therefore, there is generated no problem even if the steel pipes to which the present invention is applied are OCTG for which the required specifications become strict for the corrosion resistance and the like. After the machined identifier is removed by the thread cutting, when the corresponding identifier is stencil-marked on the steel pipe in the stencil marking and packing process which is the on-line process collectively managed by the process computer 3, it is advantageous in the case where the production history information on each steel pipe is referred to later. That is, the stencil-marked identifier is inputted to the management means 3, which allows the easy extraction of the production history information stored while associated with the identifier in each process for producing the steel pipe.

The invention claimed is:

1. A method for managing production history information of a pipe or tube in a process for producing the pipe or tube to which thread cutting is performed on end portions thereof, the method comprising the steps of:

machining an identifier for identifying the pipe or tube in a region of the pipe or tube on which the thread cutting is to be performed by machining means before an initial production process is performed among production processes which are management targets of the production history information;

reading the identifier machined on the pipe or tube with reading means before each of the production processes is performed or while each of the production processes is performed;

storing the production history information of the pipe or tube obtained in each of the production processes and the identifier read from the pipe or tube while the production history information and the identifier are associated with each other; and removing the identifier machined on the pipe or tube in the process of performing the thread cutting on the end portions of the pipe or tube among the production processes which are management targets of the production history information.

2. An apparatus for managing production history information in a process for producing a pipe or tube to which thread cutting is performed on end portions thereof, the apparatus comprising:

machining means for machining an identifier for identifying the pipe or tube in a region of the pipe or tube on which the thread cutting is to be performed before an initial production process is performed among production processes which are management targets of the production history information;

reading means for reading the identifier machined on the pipe or tube before each of the production processes is performed or while each of the production processes is performed;

management means for storing the production history information of the pipe or tube obtained in each of the production processes and the identifier read with the reading means from the pipe or tube while the production history information and the identifier are associated with each other; and thread cutting means for removing the identifier machined on the pipe or tube in the process of performing the thread cutting on the end portions of the pipe or tube among the production processes which are management targets of the production history information.

3. A method for producing a pipe or tube, comprising a production process in which production history information is managed by the method according to claim 1.

* * * * *